United States Patent [19]
Boyer

[11] 3,891,777
[45] June 24, 1975

[54] METHOD OF MAKING PROTEIN FOOD PRODUCTS RESEMBLING CHEESE

[75] Inventor: Robert Allan Boyer, Creve Coeur, Mo.

[73] Assignee: Ralston Purina Company, St. Louis, Mo.

[22] Filed: Apr. 28, 1971

[21] Appl. No.: 138,304

Related U.S. Application Data

[63] Continuation-in-part of Ser. No. 40,365, May 25, 1970, abandoned.

[52] U.S. Cl. ............... 426/573; 426/656; 426/507
[51] Int. Cl. ............................................. A23j 3/00
[58] Field of Search ............ 99/17, 63, 64, 98, 115, 99/116, 117, 122, 123; 426/350, 364, 507

[56] References Cited
UNITED STATES PATENTS 3,303,182   2/1967   Sakai et al. .......................... 99/17 X
3,310,406   3/1967   Webster............................... 99/17 X

*Primary Examiner*—James R. Hoffman
*Attorney, Agent, or Firm*—Virgil B. Hill

[57] ABSTRACT

This invention relates to novel protein food products specifically sliceable protein food products resembling process cheese and methods of producing these products from a vegetable proteinaceous material. The method of producing these food products with a vegetable proteinaceous material as the major ingredient generally comprises acidifying an aqueous slurry of the vegetable proteinaceous material to yield the damp, viscous curd of the proteinaceous material followed by treatment of the curd in combination with various flavorings and ingredients such as fats, salts, and starches including heat setting in order that a highly desirable, smooth texture may be imparted to the food product and make it closely resemble a natural process cheese.

18 Claims, No Drawings

METHOD OF MAKING PROTEIN FOOD PRODUCTS RESEMBLING CHEESE

BACKGROUND OF THE INVENTION

This application is a continuation-in-part of my copending application Ser. No. 40,365 filed May 25, 1970, now abandoned.

This invention relates to novel protein food products and a process for producing the same.

Process cheeses or pasteurized process cheese have been much in demand by the consumer as a food staple. Most natural process cheeses, while of an appealing and desirable taste and texture, suffer somewhat from variations in quality. Likewise, they are composed mostly of a large percentage of fat and casein which is largely responsible for the texture of the product. The high percentage of fat which is present in natural cheese, however, further increases the caloric content of the foodstuff and generally makes it unsuitable for dietary purposes.

Simulated food products have been previously attempted from various more readily available vegetable sources. Such sources include a vegetable protein material such as, for example, oleaginous protein materials such as soybeans, cottonseed, peanuts, etc. The primary advantage of food products containing a high percentage of vegetable protein lies not only in the nutritive boost achieved by the protein, but also in the dietary improvement which would result because of the low calorie content of the protein material which is used. It may also be more economical to employ readily available vegetable protein materials in place of the more expensive animal protein or similar materials.

Most synthetic food products which have been composed substantially of vegetable protein materials have been produced and textured as meat substitutes. Accordingly, they are designed to resemble meat in texture and mouthfeel by imparting a fibrous or chewy structure to the vegetable protein material. While such a fiber structure is highly desirable and useful in making simulated meat products, it is not suitable for, nor does it closely resemble, other types of food products which naturally do not have the texture or structure of connective animal tissue or meat. As previously noted, most process cheeses which are smooth, such as a cheese spread and also sliceable cheese, incorporate a high percentage of fat as the fatty phase to produce a product which is readily spreadable as well as sliceable at room temperature. Previously, when a spread or process-type cheese was desired which was composed substantially of vegetable protein, it was necessary to incorporate a very high percentage of fat as a fatty phase to produce a smooth or spreadable texture. Such products not only failed to take advantage of the higher nutritive value of the vegetable protein, but further had a high caloric intake because of the percentage of fat. Additionally, such products contained only a small portion of vegetable protein and were also lacking in desirable mouthfeel characteristics and smoothness. Rather, most of these products were either grainy, mealy or of a gelative type of consistency with either poor spreadability, or if designed to be a sliceable cheese, had a rubbery texture, resembling a gel more than a cheese. Thus, the prior art has been generally deficient in providing a process for the production of spreadable food products with acceptable texture when the food product is composed substantially of vegetable protein.

SUMMARY OF THE INVENTION

I have, therefore, developed food products which are composed substantially of vegetable proteinaceous material, as well as processes for making such products, which substantially overcome difficulties noted in the prior art when forming products resembling process cheeses, especially several types of sliceable process cheeses.

I can produce products with a vegetable proteinaceous material as the sole or substantially major ingredient, having a texture which may be considered to be both smooth and creamy, and also readily spreadable or sliceable without the need for a high percentage of fat to impart spreadability, smoothness, or sliceability. This not only takes full advantage of the superior nutritive value of the vegetable protein, since the protein content is not reduced by the presence of other materials such as a high percentage of fat, but also reduces the caloric content of the product and makes it suitable for dietary purposes.

The smooth textured food products which I have devised with a vegetable proteinaceous material as the major ingredient and which I have found can be made to closely resemble various types of process cheeses, may be produced by several alternate processes and with the use of several alternative ingredients for each type of process. The vegetable proteinaceous material when used as the major ingredient may be of several types, and can utilize alternate processes for the production of sliceable cheese products.

In general, the vegetable proteinaceous material which is employed as the starting material is the damp viscous curd derived from the acid precipitation of a suspension or solution of the vegetable protein material. It in turn, may be of several different types, with each type having qualities making it highly functional as cheese substitutes. One type of the curd which I consider to be unique and a preferred embodiment of my invention is the curd which is derived from the acid precipitation of a slurry or suspension of a vegetable proteinaceous material which has been previously heated or warmed. When the heating step is used, a special curd is obtained during precipitation, which as described fully hereinafter, is a more "hydrated" or "fluffy" curd and has improved properties of blandness, whiteness and body besides having a lower solids content, so that it becomes very suitable for the production of cheese substitutes. This special curd is particularly functional when employed in a continuous process, which will be hereinafter described, and an excellent sliceable, process cheese product may be made therefrom when a modified cross-linked, tapioca starch, which is heat stable above about 250° F. is also added to the proteinaceous material during the continuous processing step.

As an alternate embodiment of the present invention, when no heating step is employed during precipitation of the curd from the vegetable proteinaceous slurry, a type of curd results which has a higher solids content than the previously mentioned unique curd, and although having higher solids content has less body then the fluffy curd derived by the use of heating. However, it is still suitable for the production of sliceable cheese type products as described herein, and may be used in the production of sliceable cheese type products with or without a starch additive.

Thus, the curd as derived from either the heated or unheated acid precipitation step, may be processed on either a batch or continuous basis, and is further generally processed in combination with other ingredients to produce an imitation process cheese, sliceable in nature and which is composed substantially of vegetable protein.

The process for production of the process, sliceable cheese products in general involves holding the vegetable proteinaceous material together by the employment of pressure, either in the positive or negative sense. The employment of pressure in a positive sense generally is meant to refer to the application of a positive external pressure to the curd relative to the pressure of the curd (normally atmospheric). The employment of pressure in a negative sense is meant to refer to application of a pressure which is negative relative to that of the curd, normally removal or evacuation of entrapped air or gas in the curd will result in the improvement of pressure in the negative sense. Application of a positive or negative pressure in such a manner, compresses the proteinaceous curd material to hold the same together, so that the product may be heat set and form an irreversible proteinaceous gel but with a smooth, but sliceable, texture and with an absence of voids or spongy appearance.

It is, therefore, a major object of the present invention to form smooth, textured, sliceable food products resembling a sliceable process cheese product from a damp, viscous curd derived by the precipitation of a slurry of vegetable protein. The curd is a hydrated form of vegetable protein which, because of its high water capacity, has qualities making it particularly suitable as a major ingredient for a smooth textured food product.

DESCRIPTION OF THE PREFERRED EMBODIMENTS

The vegetable proteinaceous materials which are particularly useful in the production of the protein food products of the present invention are those proteinaceous materials derived from various oleaginous materials, in particular the oil seeds such as soybeans. The proteinaceous material which is highly functionable in my invention may be termed as the damp curd or isolated protein from the oleaginous protein source. The following process will generally describe the production of vegetable proteinaceous materials which may be employed in my invention.

Soybean meal or flakes which have been defatted are the preferred starting material. The defatted or solvent extracted soybean meal or flakes are then dispersed in an aqueous suspension in which the water is employed in an amount of from about 10 to 20 times by weight of the soybean flakes or soybean meal employed. This aqueous solution or slurry with the soybean material dispersed therein is subjected to an elevated pH between 8 and 11 to largely put the proteinaceous material in solution. Following this, suspended solids are removed from the solution by centrifugation or similar means until clarification of the solution is obtained.

After the protein is put into solution at the elevated pH and the other solids are removed, the proteinaceous solution is then subjected to precipitation either with or without a prior heating step as previously noted. If the heating step is used, a special curd is obtained during precipitation, as described fully hereinafter. Precipitation is achieved by adjusting the pH to a value at or near the isoelectric point of the protein, i.e. in the pH range between about 4.5 and 5.5. This pH adjustment is done by the addition of a suitable acidifying agent such as phosphoric, acetic, lactic, citric, hydrochloric, sulfuric or sulfurous acid or other types of inorganic or organic acids known to be suitable for food use.

The precipitated protein or curd produced during this stage of the processing of the vegetable proteinaceous material may be one of several types and consequently require alternate means of production or processing. For example, if no heat is employed prior to the acidification step, a type of curd results which generally has a solids content by weight of 15 to 45%. This precipitated protein or curd may be separated by decantation, filtration, or centrifugation. The filtered curd mass is removed and subsequently washed 2 to 3 times to remove and solubilize various carbohydrates, and hence objectionable "bean-like" flavors which the acid precipitation step is designed to remove. This type of damp curd-like mass will generally have a solids content by weight of about 15 to 45%, a pH between about 4.5 and 5.0, and a moisture range of about 55 to 85%. This form of precipitated protein, while suitable for the production of the sliceable cheese-type products, is not the preferred type of curd for cheese-type products. The following alternate means will produce a unique viscous curd which is preferred for the production of the sliceable cheese-type products of my invention.

This alternate process for the production of a unique curd mass or precipitated protein primarily concerns employment of an elevated temperature prior to the acidification step. Generally, the elevated temperature used is about 160° F. to 310° F., for a period of time of from about 10 seconds to 30 minutes. More specifically, the temperature usually will be controlled between about 210° F. to 250° F. for a period of time of between 10 and 30 seconds. The time of the heating operation is a function of the temperature employed in the process. At high temperatures a very short heating step is used, while at lower temperatures a somewhat longer heating step is employed. For example, at 210° F. to 250° F., a heating time of between 10 and 30 seconds is satisfactory, while at about 160° F., it is necessary to heat about 30 minutes. If a temperature as high as 310° F. is employed, a time of only about 5 seconds is used in the process.

The damp or hydrated curd produced by this alternate process may be generally described as a fluffy curd. It has a solids content lower than that of the other type of curd, and generally in the range of 10 to 20% by weight, with a pH between about 4.6 and 5.5, and a moisture content of about 80 to 90% by weight. The precipitated fluffy or hydrated curd may be separated from the liquid phase by filtration of the mass, decantation of the liquid, or centrifugation. The separated mass or curd is likewise washed two to three times to remove any previously unsolubilized sugars or carbohydrates. The basic and unique product obtained is one of excellent taste characteristics, color, and functionality. The product has an optimum combination of functional properties not obtainable heretofore from protein isolates, besides having an excellent bland flavor, free of the characteristic soy flavor.

The material of hydrated protein may be used directly in food products without drying. It is particularly desirable in a spreadable or sliceable cheese food product because of its high water and low solids content which allows it to retain a unique smooth texture. The product is an attractive, white, homogeneous, creamy substance containing most of the protein in a combination partially dissolved state and partially dispersed colloidal state that does not tend to settle out of its aqueous base. The product is completely bland to the taste, with the bitter flavor characteristics of soy protein being gone. In dry form, it is actually capable of rapid rehydration to a suspension, simply by adding water and stirring.

The novel processing not only drastically improves the flavor and odor, and provides functionality, but also causes a distinct and advantageous change in appearance. That is, prior to such processing, the color is yellowish, particularly as suspended in slurry form. After processing, the product is a whitish, creamy substance. When dried, the whitish colored product has the attractive appearance of dried skim milk.

It is theorized that the unique properties of the protein isolate which results from the process of this invention are due to a change in the structure of the soy protein during the process. The soy protein recovered in the extraction process is primarily soy glycinin, a complex protein having a tightly folded structure and a high degree of cross-linking which holds the molecular chains in close proximity. The cross-linking in the glycinin molecules is primarily in the form of disulfide or S—S bonds. During the heat treatment of the extracted liquor by the process of the invention, it is believed that some of the disulfide bonds are split and reduced to sulfhydryl groups. The splitting of some of the disulfide bonds is believed to relax some of the force holding the protein chains together, so that the distance between adjacent chains or folds increases and more of the polar groups of the protein molecules are exposed. Water is then able to wedge between some of the adjacent protein chains to bond with the available polar groups and-/or hydrate portions of the protein molecules which were not previously reactive. The fact that additional water is bound in the protein molecule is believed evidenced by the different per cent solids per volume and per cent solids per weight values are compared to protein isolated by standard methods. The compaction ratio of the protein produced by the method of this invention is another indication that additional water is held in the protein molecules. Hence, as a consequence of the greater number of disulfide bonds which are believed severed by the process of the invention, the protein isolate produced exhibits the retention of a greater quantity of water on compaction.

Specifically, the hydrated curd typically has a white color having a brightness of above 60, preferably above 65, and has a compaction ratio of above 0.10, and preferably between 0.15 and 0.30. The brightness of the product was measured with a Photovolt reflection meter model 610 by adjusting the solids content to 10.0% by weight and placing a sample in a Petri dish until the dish is filled with the sample. Using this technique, the Petri dish is covered and the per cent of whiteness is measured as the per cent compared to a magnesium oxide standard. This accepted technique is described in the Photovolt Corporation Circular 660, "Photovolt Reflection Meter Model 610," Photovolt Corp., New York, N.Y., June, 1964.

The unique protein isolate or curd product has a very high specific volume believed due to water which is bound in and/or to the protein molecules. The specific volume is determined by adjusting the product to a solids content of 2% by weight and centrifuging a 50 ml. sample of the product at 570 g for 10 minutes. The volume of the recovered centrifuged curd divided by the weight of total dry solids present in the centrifuged curd equals the specific volume of the curd.

The compaction ratio of the protein isolate product is determined by centrifuging a 50 ml. sample of the product which has been adjusted to a solids content of 2% by weight at 570 g for 10 minutes; the ratio of the volume of centrifuged solids to the volume of supernatant liquor is the compaction ratio. The amount of retained moisture in the material is determined by measuring the moisture content of the centrifuged solids. The retained moisture is the proportion of grams $H_2O$/gram solids.

In the production of sliceable cheese type food products utilizing the curd of the vegetable proteinaceous material, especially the hydrated damp curd isolated at the elevated temperature, various ingredients must be used in combination with the curd to provide characteristics in the resultant products for close simulation of their natural counterparts, and also to allow for use of the curd in a continuous type process. As previously noted, the hydrated curd precipitated at an elevated temperature is preferable in the formation of cheese-type, smooth-textured food products, although the curd which is not isolated at an elevated temperature is also suitable.

To produce smooth-textured food products, such as cheese, there are several factors related to the proteinaceous material which should be controlled because of their collective effect on the consistency or smoothness of the final product. Firstly, the pH of the curd influences the consistency as well as the flavor of the smooth-textured food products and is preferably controlled within the range of about 4.8 to 7.0. In fact, if the pH of the curd is increased or maintained as by the addition of suitable alkaline materials in the range of from 5.4 to 6.0, the best smoothness of products made with the curd is obtained. Controlling the pH within this range, likewise aids in maintaining smoothness of products when produced by a continuous process as opposed to a batch process.

In a batch-type process for production of a smooth, cheese type food product, the curd, either hydrated or regular, is mixed with various ingredients which contribute to and provide characteristics for the resultant products. The curd with the adjusted solids content is placed in a suitable mixer or similar device, and the pH preferably adjusted to the range of 5.4 to 6.0. Various ingredients such as salt, sugar, fat, starches, gums, preservatives, and flavors are then mixed with the curd to contribute desired characteristics to the final product.

The salt, such as sodium chloride, increases the smoothness of the products of the present invention. It is believed that, during heat setting of the protein to form a cohesive, smooth, spreadable body, the salt controls cohesiveness of the protein mass to some extent. It may generally be added in an amount of about 1 to 3% by weight of the final product, although preferably within the range of 0.4 to 2.5% by weight of the final product. The exact amount also depends on the desired taste of the final product.

It is also desirable in some instances to add a small percentage of an animal protein such as sodium caseinate since this improves cutability, sliceability, as well as smoothness of the final product. The animal protein may normally be added in an amount of from 1 to 15% by weight of the final product depending on the exact consistency desired, but preferably about 5%.

Although the addition of animal or vegetable fat is not necessary for smoothness of the products of the present invention; nevertheless, the addition of a relatively small amount of fat, in an amount from about 2 to 15% by weight, preferably about 5%, of the final product, contributes to the taste and mouthfeel of the products, enabling the present products to even more resemble exactly their natural counterparts. The exact amount added is dependent on the flavor desired.

Other additives may be added to the mixture at this stage. Examples are gums in an amount of 0.2 to 1% by weight of the final product. These tend to promote the water binding properties of the product and contribute to the body or consistency thereof. They are particularly useful when for example, curd with a lower solids content than the range specified is employed, i.e. less than 10%. Such additives additionally aid in the prevention of syneresis or "weeping" of the final product upon storage. Various preservatives may also be added to contribute to the shelf life of products produced in the present invention. A typical preservative is sorbic acid, and preferably added in an amount of about 0.2% by weight of the final product. Corn syrup may also be added in combination with various flavoring ingredients depending on the cheese or dairy flavor employed to tone down any astringent flavors which are present. Various imitation cheese or dairy flavors may be employed, depending on the final product and the particular use. Specific flavors are not critical to the practice of the present invention, and may ordinarily be determined by one skilled in the art knowing the type of final product desired.

In the production of a sliceable cheese-type product from a vegetable proteinaceous material, I have determined that the best sliceable cheese products are obtained when a suitable amount of starch is added to the vegetable proteinaceous material. This aids in adding body to cheese-type products, and helps to impart characteristics to the product making it more closely resemble in texture and appearance a natural process sliceable cheese product.

The type of starch which should be added will depend upon the process employed for the production of the cheese product. For example, if a continuous, aseptic type of process is used for the production of sliceable cheese type products, and if the previously described unique fluffy vegetable proteinaceous curd is used with the continuous process, the process to be fully described hereafter, a cross-linked modified tapioca starch, is preferred for addition to the curd prior to processing. Such a product which is commercially available and highly functional in a continuous, aseptic process is Tenderfil No. 8 starch produced by A. E. Staley Manufacturing Company, Decatur, Ill., or National Purity starch produced by National Starch and Chemical Company, New York, N.Y.

If, however, a non-aseptic type process is employed, utilizing regular curd or that derived from an unheated acid precipitation step, as well as fluffy curd, as the proteinaceous starting material, and, further, if a non-aseptic temperature lower than about 250° F. is used for heat setting, then a starch material in general, which is suitable for food use as opposed to a specific modified type of starch may be employed. Examples are corn or milo starch. The use of these types of starches, which are composed of mixtures of both amylose and amylopectin are not suitable for the higher temperature and aseptic continuous process, since they decompose or degrade at the higher temperatures involved.

In either case, whether the Tenderfil No. 8 starch material, or a starch in general is employed for production of a cheese product, it is preferred that the starch be added to the vegetable proteinaceous material in an amount of between about 0.5 to 5% by weight of the final product.

It is also possible to produce a sliceable cheese product with a vegetable proteinaceous material as the major ingredient by a batch, non-aseptic process, without the use of any added starch. Although such a process is intended to be a specific embodiment of my invention, nevertheless, such products while suitable, produce a different type of process cheese as do products made with the use of a starch material. Generally, when no starch is employed, a harder, more "brittle" type of cheese is produced which is not as smoothly sliceable and may be said to resemble more of a "mozzarella" type of cheese. Furthermore, to produce a sliceable cheese type product without the use of added starch, it is necessary to employ a vegetable proteinaceous material with a solids content above about 18% in order to impart a firm, sliceable consistency to the product. This embodiment will therefore usually necessitate the use of the regular curd or curd produced without preheating of the vegetable protein slurry, since it inherently has a higher solids content than the fluffy or hydrated curd produced with the use of a heating step.

After formulation, the curd and other ingredients are then mixed as for example, by homogenization. The homogenization may be carried out by any of the known methods or with any of the known pieces of equipment for performing such. The present invention is not intended or considered to be limited to the degree of homogenization or manner of performing it. This is only to physically masticate and mix the proteinaceous curd and various ingredients so that such may be easily employed in the process I have developed.

After homogenization or mixing of the slurry of the proteinaceous material and the various flavorings and other ingredients, the vegetable proteinaceous material may be compressed and held together to produce a smooth textured product by several alternate means. It is theorized that the compressing or holding of the vegetable proteinaceous material together is more specifically accomplished by the protein molecules being forced together and in close proximity to produce a consistently smooth textured product. As noted, there are several alternate processes by which a smooth texture may be imparted to a cheese type food product with a vegetable proteinaceous material as the major ingredient. One such process consists of compressing the vegetable proteinaceous material together by the employment of pressure in a negative sense which is generally defined to mean removal of the entrapped air or gas from the slurry of the vegetable proteinaceous material by suction or vacuum, to prevent its localization and expansion of the protein material during heat setting of the same. The same results may also be achieved by not removing the air, but keeping it substantially dispersed or disposed throughout the product during heat setting and preventing its expansion, by the application of a positive external pressure. This also prevents localization of the air during heat setting of the protein. The term localization is generally meant to mean the collection or assimilation of air or gases in the product so as to create visually noticeable bubbles or voids which would be permanently set in the protein slurry upon heat setting of the same.

Using the negative pressure technique noted, after homogenization, the air entrapped in the protein slurry and the various flavorings and other ingredients are removed by subjecting the homogenized slurry to a suitable vacuum to deaerate the same. Deaeration of the homogenized slurry can be accomplished by the employment of a vacuum of at least about 27 inches of mercury on the viscous slurry. Lesser vacuums do not usually remove a sufficient amount of air from the proteinaceous slurry to compress the slurry and place the same in such close and intimate proximity so that localization of the air will not occur when the protein material is heat set, i.e. employment of a lesser vacuum will usually result in incomplete removal of air or gas which is present during heat setting of the protein, expands and localizes to create undesirable voids or bubbles during heat setting. This produces a crumbly or spongy structure as opposed to a desirable smooth, creamy texture. The deaeration may be carried out in any type of apparatus capable of attaining the vacuum indicated and suitable for commercial production of smooth textured products.

Alternatively, using the positive pressure technique, a smooth texture may be obtained if, instead of deaerating the slurry, the air is allowed to remain therein but is kept uniformly disposed throughout the slurry and prevented its expanding and localizing during heat setting of the protein material. This may be conveniently carried out by subjecting the homogenized slurry to an external or positive pressure, as by confinement of the same in a container, space, or limited space so that the protein material is compressed or kept in intimate relation during heat setting; thus air is entrapped therein and is prevented from forcing the proteinaceous material apart to create bubbles or voids and a resulting undesirable, crumbly texture. Prevention of localization of the air in this manner allows production of a smooth textured product which maintains its smooth character because of its hydrated characteristics and low solids content. The positive pressure which is necessary may typically be only slightly above ambient, and may be merely that pressure which is exerted on the material by a container such as a pipe casing or can. Typically very high pressures are not necessary. It should also be realized that a combination of internal negative pressure and external positive pressure can be employed.

Following treatment of the proteinaceous slurry to compress or hold the protein material together, heat setting of the slurry may be carried out at a temperature of at least about 160° F. for a period of time which will vary depending on the temperature employed. The particular temperature and time will vary depending on the exact temperature and time. Higher temperatures require shorter heating time and lower temperatures longer heating time. Heat setting of the protein slurry while being held together results in thickening of the slurry, and promotes the formation of a smooth-textured slurry which is thick and upon cooling set ups into a solid cheese-type product, resembling in texture and appearance a process cheese made from casein and milk materials. Generally, the degree or amount of heat to accomplish heat setting of a spreadable or sliceable type food product composed substantially of vegetable protein may be typically high enough to at least pasteurize the product and reduce substantial bacteria contamination. Such a temperature will typically be in the vicinity of around 212° F. or higher.

The version of this novel process which is preferred from the standpoint of economy and convenience, particularly for commercial practice, is the continuous version as opposed to the batch-process version previously discussed. Generally, this process version comprises rapidly setting the uniform and homogenized slurry with or without deaeration through a series of successive heat exchangers. This is done at such a rate and in such a manner that the homogenized slurry is continuously agitated or mixed by movement through the system. Thus, entrapped air is kept disposed throughout the slurry while the same is under confinement, the confinement producing an external pressure as well as a back pressure, this pressure compresses or holds the proteinaceous material together, simultaneously with, rapid heat setting of the slurry, to yield a smooth-textured, thickened, spreadable or sliceable food product.

For example, the proteinaceous slurry may be pumped from a homogenizer through a pipe, say three-eighths inch or so in diameter, at a rate of about 2 lbs. per minute, through two successive heat exchangers held at a temperature of from about 220° F. to as high as 300° F. Typically, the exact temperature employed in the heat exchanger will be dependent upon whether either a pasteurized or sterilized product is desired. To produce a sterile product, a temperature above about 250° F. is needed. The hold time of the slurry in each heat exchanger may be varied between about 10 and 25 seconds, with the exact hold time being dependent upon the temperature employed. Following this, the product which has been heat set is cooled by passing it through a heat exchanger set at a lower temperature. It is preferred in the formation of the cheese-type products of the present invention to have the last coil near the exit of the heat exchanger set at a temperature of between about 180°–215° F. as opposed to cooling the material in the range of 60°–150° F. as is required for products of a spreadable consistency. The use of a higher exit temperature maintains the material in a flowable, or matter state, until it can be poured or pumped directly into a mold or container where it is allowed to cool to about room temperature and set up into a firm, sliceable cheese-type product of smooth texture.

Confinement of the slurry in the pipe during the continuation process, along with the continuous agitation or mixing which is produced by the continuous pumping or movement of the slurry through the pipe, keeps entrapped air disposed throughout the product and prevents any localization of the air or gases to cause bubbles or voids. This continuous means of producing smooth-textured cheese-type protein food products is preferable from the standpoint of being readily adaptable to commercial production of large quantities of cheese-type products with a vegetable proteinaceous material as the major ingredient.

Briefly, therefore, the product produced by either the batch or continuous versions of the process, and composed substantially of a vegetable proteinaceous material is a smooth textured product resembling a sliceable process cheese. Such a product has the desirable characteristics of being composed substantially of protein while being low in fats and sugars. Thus, it is suitable for a high protein, low calorie diet. Typically, the product will contain from 10 to 40% protein by weight, have a 45 to 75% moisture content by weight, have a smooth uniform texture, and exhibit substantially no visible "weeping" or separation of moisture from the product. Such a product and composed substantially of vegetable protein also has a number of highly desirable functionable characteristics. That is to say, since it does not melt or become liquid at elevated temperatures, it may be used as a filler for cookies, pies, rolls, or other pastry products. It may be added prior to cooking or baking without weeping or melting of the filler during baking or cooking in sharp contrast with standard cheese spreads or fillers produced from dairy products. Such dairy products melt at very low temperatures and are not suitable for such applications.

Although the inventive concepts will be readily understood from the foregoing description by one having ordinary skill in the art, the following examples are given to further illustrate the invention and to assure a complete understanding thereof.

EXAMPLE 1

Soybeans were cracked, dehulled, and flaked and the flakes extracted with hexane to remove the oil and produce a high DPI soybean flake. The defatted flakes were added to an aqueous bath. A food grade alkaline reagent, sodium hydroxide, was added until a pH of 8.75 was reached. The material was extracted for 30 minutes and then centrifuged to clarify the extract. The clarified liquor had a pH of 10.

The clarified liquor is then processed by alternate means to yield different forms of precipitated protein. To a portion of the clarified liquor, phosphoric acid is added until the isoelectric point was reached at about a pH of 4.6–5.0. The precipitate was then washed with water and centrifuged to concentrate the protein isolate. The isolate or damp viscous curd had a solids content of about 23%.

Another portion of the clarified liquor was heated to about 210° F. for about 30 seconds and cooled. To the heated liquor, phosphoric acid was added until the isoelectric point or a pH of about 4.6–5.0 was achieved. The precipitate produced thereby was washed with water and centrifuged to concentrate it. The isolate or curd had a specific volume of 6.4, a solids content by weight of 16.9% and a protein content of 96% by weight on a dry basis. The product was compacted in an International Model UV 10 inches diameter centrifuge for 10 seconds at 570 g and displayed a compaction ratio of 0.22. The retained water in the protein material was 5.1 grams of solids. The concentrated isolate or curd was white, bland and had a brightness of 65.0 when measured by The Photovolt Model 610 color meter.

EXAMPLE 2

A food product resembling a brick type cheese which is readily sliceable and composed substantially of vegetable protein was produced by using the curd derived by the acid precipitation step, but without heat as set forth in Example 1. Additionally, the curd as employed in the production of the food product had a solids content of 30% by weight. The curd was then blended in a mixer with the following ingredients until uniform.

| | |
|---|---|
| 300 | grams regular Curd (30% solids) |
| 10 | ml. Trisodium Phosphate (20% solution) |
| 6 | grams Sodium chloride |
| 6 | grams Sugar |
| 1.6 | ml. Naarden Cheddar Cheese Flavor No. RR 36374 |
| .6 | cc. Lactic acid |
| 50 | grams Refined vegetable oil |
| 60 | grams Bordens Cheese Powder No. 3516 |
| 10 | grams Bordens Cheese Powder No. 3647 |
| .5 | grams Sorbic acid |

This mixture was then homogenized into a uniform slurry, deaerated by placing in a shallow dish, which was placed in a desiccator and subjected to a vacuum of about 29 inches of Mercury for 35 minutes. The deaerated mixture was then placed in a brick shaped loaf pan and heated in a steam atmosphere for about 45 minutes. After cooling, a firm cheese type product which was readily sliceable and which resembled in taste and aroma a mild store cheese, such as a Colby cheese, was produced.

EXAMPLE 3

A sliceable food product resembling a process cheese was produced by using the curd derived by the acid precipitation step, as set forth in Example 1, but without heat being applied prior to precipitation. It was uniformly mixed in the following amount, and with the listed portions of each named ingredient.

| | |
|---|---|
| 350 | grams Curd (23% solids) |
| 10 | grams Sodium chloride |
| 40 | grams Refined vegetable oil |
| 1.1 | grams Xanthan gum |
| 18 | grams Corn starch |
| 2 | grams Ed Long cheese flavor 1200s |
| 1.0 | ml. New York shade yellow dye (2.5% solution) |
| 18 | ml. Trisodium Phosphate (20% solution) |

This mixture was then homogenized into a uniform slurry and deaerated by placing in a shallow dish which was in turn placed in a desiccator and subjected to a vacuum of about 29 inches of Mercury until bubbling of air from the mixture subsided. This mixture was then poured into a loaf shaped pan and placed in a steam atmosphere held at a temperature of 212° F. and heated, therein, for about 45 minutes. After cooling, a firm cheese type product was produced which was readily sliceable and had both an elasticity and creaminess in texture that was very close to a natural process cheese.

EXAMPLE 4

The curd derived from the acid precipitation step as set forth in Example 1, and without heat being applied prior to precipitation, was mixed in the following amount and with the listed portions of each named ingredient.

| | |
|---|---|
| 250 | grams Curd (23% solids) |
| 6 | grams Sodium chloride |
| 15 | grams Refined vegetable oil |
| 23 | ml. Trisodium Phosphate (20% solution) |
| 2.5 | ml. Lactic acid |

-Continued

| | |
|---|---|
| 37 | ml. Water |
| 0.3 | grams Xanthan gum |
| 2 | ml. F. D. C. No. 5 yellow dye (2.5% solution) |

This mixture was then homogenized and deaerated as set forth in Example 3, and placed into a pan which was heated in a steam atmosphere held at a temperature of 212° F. for about 45 minutes. After cooling, a firm cheese type product was produced which was readily sliceable and smooth and resembled the texture of mozzarella type cheese.

EXAMPLE 5

The curd derived from the acid precipitation steps as set forth in Example 1, and without heating being applied prior to precipitation was mixed in the following amount, and with the listed portions of each named ingredient. Additionally, the curd as employed in the production of the food product had a solids content of 30% by weight.

| | |
|---|---|
| 5000 | grams Curd (28% solids) |
| 1086 | grams Water |
| 190 | grams Sodium chloride |
| 865 | ml. Refined vegetable oil |
| 19 | grams Xanthan gum |
| 311.4 | grams National "purity starch" |
| 17.3 | ml. New York shade yellow dye (2.5% solution) |
| 34.6 | grams Ed Long cheese flavor 1200s |
| 7.6 | grams Sorbic acid |
| 150 | ml. Sodium hydroxide (20% solution) |

This mixture was then homogenized in a homogenizer and then rapidly and continuously pumped from the homogenizer through a series of three heat exchangers. The first two heat exchangers were held at a temperature of 285° F. The third heat exchanger and the last heat exchanger or "exit" heat exchanger in the series was held at a temperature of 185° F. The slurry was pumped from the homogenizer through the series of heat exchangers at a rate of about 2 lbs. per minute, such that the holding time of the slurry in each heat exchanger was about 15 to 25 seconds. After passage of the slurry through the third exchanger in the series, the slurry was exited into aluminum tins of about 4 × 4 inches in size. The slurry in the tins was allowed to cool to room temperature. After cooling, the product was removed from the tins, sliced, and examined. The product had a texture very close to a process cheese, in that it sliced very readily, was somewhat elastic and was smooth when crushed.

EXAMPLE 6

The isolate or curd produced by acid precipitation of the heated protein slurry in Example 1 was formulated and mixed with the following ingredients:

| | |
|---|---|
| 6000 | grams "Fluffy" curd (12% solids) |
| 150 | ml. Sodium hydroxide (20% solution) |
| 430 | grams Refined vegetable oil |
| 200 | grams Sodium chloride |
| 15 | grams Xanthan gum |
| 480 | grams Corn syrup |
| 79 | grams Sodium caseinate |
| 10 | grams Sorbic acid |
| 340 | grams high acid Buttermilk solids |
| 120 | grams Tenderfil No. 8 starch |
| 45 | grams Ed Long cheese flavor 1200s |

-Continued

| | |
|---|---|
| 12 | ml. New York shade dye (2.5% solution) |
| 13 | ml. Lactic acid |

This mixture was then homogenized in a homogenizer and then rapidly and continuously pumped from the homogenizer through a series of three heat exchangers. The first two heat exchangers were held at a temperature of 285° F. The third heat exchanger and the last heat exchanger or exit heat exchanger in the series was held at a temperature of 193° F. The slurry was pumped from the homogenizer through the series of heat exchangers at a rate of about 2 lbs. per minute, such that the holding time of the slurry in each heat exchanger was about 15 to 25 seconds. After passage of the slurry through the third exchanger in the series, the slurry was exited into aluminum tins of about 4 × 4 inches in size. The slurry in the tins was allowed to cool to room temperature. After cooling, the product was removed from the tins, sliced, and examined. The product had a texture very close to a process cheese, in that it sliced very readily, was somewhat elastic and was smooth when crushed.

EXAMPLE 7

The isolate or curd produced by acid precipitation of the heated protein slurry, as well as the curd produced without heat in Example 1, was formulated and mixed with the following ingredients:

| | |
|---|---|
| 8400 | grams "Fluffy" curd (14% solids) |
| 1218 | grams Curd (27% solids) |
| 602 | grams Refined vegetable oil |
| 49 | grams Ed Long cheese flavor 1200s |
| 280 | grams Sodium chloride |
| 22.4 | grams Xanthan gum |
| 672 | grams Corn syrup |
| 294 | grams high acid Buttermilk solids |
| 182 | grams Sodium caseinate |
| 168 | grams Tenderfil No. 8 starch |
| 55 | ml. New York shade dye (5% solution) |
| 24.5 | grams Sorbic acid |
| 650 | cc. Trisodium Phosphate (20% solution) |
| 0.6 | grams Ed Long cheese emulsion No. 2000 |

This was then homogenized in a homogenizer and then rapidly and continuously pumped from the homogenizer through a series of three heat exchangers. The first two heat exchangers were held at a temperature of 285° F. The third heat exchanger and the last heat exchanger of exit heat exchanger in the series was held at a temperature of 210°–215° F. The slurry was pumped from the homogenizer through the series of heat exchangers at a rate of about 2 lbs. per minute, such that the holding time of the slurry in each heat exchanger was about 15 to 25 seconds. After passage of the slurry through the third exchanger in the series, the slurry was exited into aluminum tins of about 4 × 4 inches in size. The slurry in the tins was allowed to cool to room temperature. After cooling, the product was removed from the tins, sliced, and examined. It exhibited the elastic texture of natural process cheese when sliced, and it sliced very cleanly. In general, it had good flavor and resembled a process cheese in both taste and texture.

It is my intention, in the appended claims, to include all such modifications or equivalents as may reasonably be included within their scope.

I claim:

1. A process for producing a smooth textured food product from isolated vegetable protein comprising:

forming an aqueous slurry of an isolated vegetable protein and water, homogenizing the slurry to form a uniform slurry of proteinaceous material, compressing the uniform slurry to substantially hold the proteinaceous material together and heat setting the protein to impart a smooth texture to the product.

2. A process as set forth in claim 1 wherein heat setting of said uniform slurry of proteinaceous material is carried out at a temperature of at least about 160° F.

3. A process as set forth in claim 1 wherein said vegetable proteinaceous material is an oilseed material.

4. A process as set forth in claim 3 wherein said oilseed material is derived from soybeans.

5. A process as set forth in claim 1 wherein said compressing step comprises removing air from said uniform slurry to substantially hold the proteinaceous material together and impart a smooth texture to said product.

6. A process as set forth in claim 1 wherein removing of the air from said slurry may be carried out with a vacuum of at least about 27 inches of Mercury.

7. A process as set forth in claim 1 wherein said compressing step comprises subjecting said uniform slurry to an external pressure sufficient to hold the proteinaceous material together and the heat set material is subsequently cooled.

8. A process as set forth in claim 1 wherein heat setting of said slurry of proteinaceous material is carried out at a temperature of at least about 160° F.

9. The process of claim 1 wherein additional flavoring and food materials are added to the slurry of isolated vegetable protein material prior to homogenizing.

10. A process for producing a sliceable, smooth textured food product from isolated vegetable protein comprising the steps of: forming an aqueous slurry of an isolated vegetable protein and water, adding starch to the slurry; homogenizing the slurry to produce a uniform slurry to proteinaceous material; compressing said uniform slurry to substantially hold the proteinaceous material together and heat setting the protein to impart a sliceable smooth texture to said product.

11. A process as set forth in claim 10 wherein said isolated vegetable protein material is an oilseed protein.

12. A process as set forth in claim 11 wherein the oilseed protein is derived from soybeans.

13. A process as set forth in claim 10 wherein said compressing step comprises removing air from said uniform slurry to substantially hold the molecules of said proteinaceous material in close proximity and impart a smooth texture to said product.

14. A process as set forth in claim 13 wherein removal of the air from said slurry may be carried out with a vacuum of at least about 27 inches of Mercury.

15. A process as set forth in claim 10 wherein the compressing step comprises subjecting said uniform slurry to an external pressure sufficient to substantially hold the proteinaceous material together and the heat set material is subsequently cooled.

16. A process for continuously producing a smooth textured sliceable food product resembling cheese from an isolated soybean protein comprising: forming an aqueous slurry of isolated soybean protein and water, adding between about 0.5 and 5% by weight of a starch capable of withstanding temperatures above about 250° F. to said slurry; homogenizing said slurry into a uniform slurry of proteinaceous material; treating said uniform slurry under confinement with continuous agitation to keep entrapped air disposed throughout said slurry and substantially hold the proteinaceous material while simultaneously and rapidly heat setting said slurry at a temperature above about 250° F. to impart a smooth sliceable texture to said product; and cooling the heat set product.

17. The method of claim 16 wherein the pH of the slurry is adjusted to between about 4.8 and 7.0 prior to heat setting the protein.

18. The method of claim 17 wherein the pH is adjusted to between about 5.4 and 6.0.

* * * * *